Nov. 21, 1939.    C. C. FARMER    2,180,870
MAGNETIC RAIL BRAKE
Filed Oct. 19, 1937    2 Sheets-Sheet 1
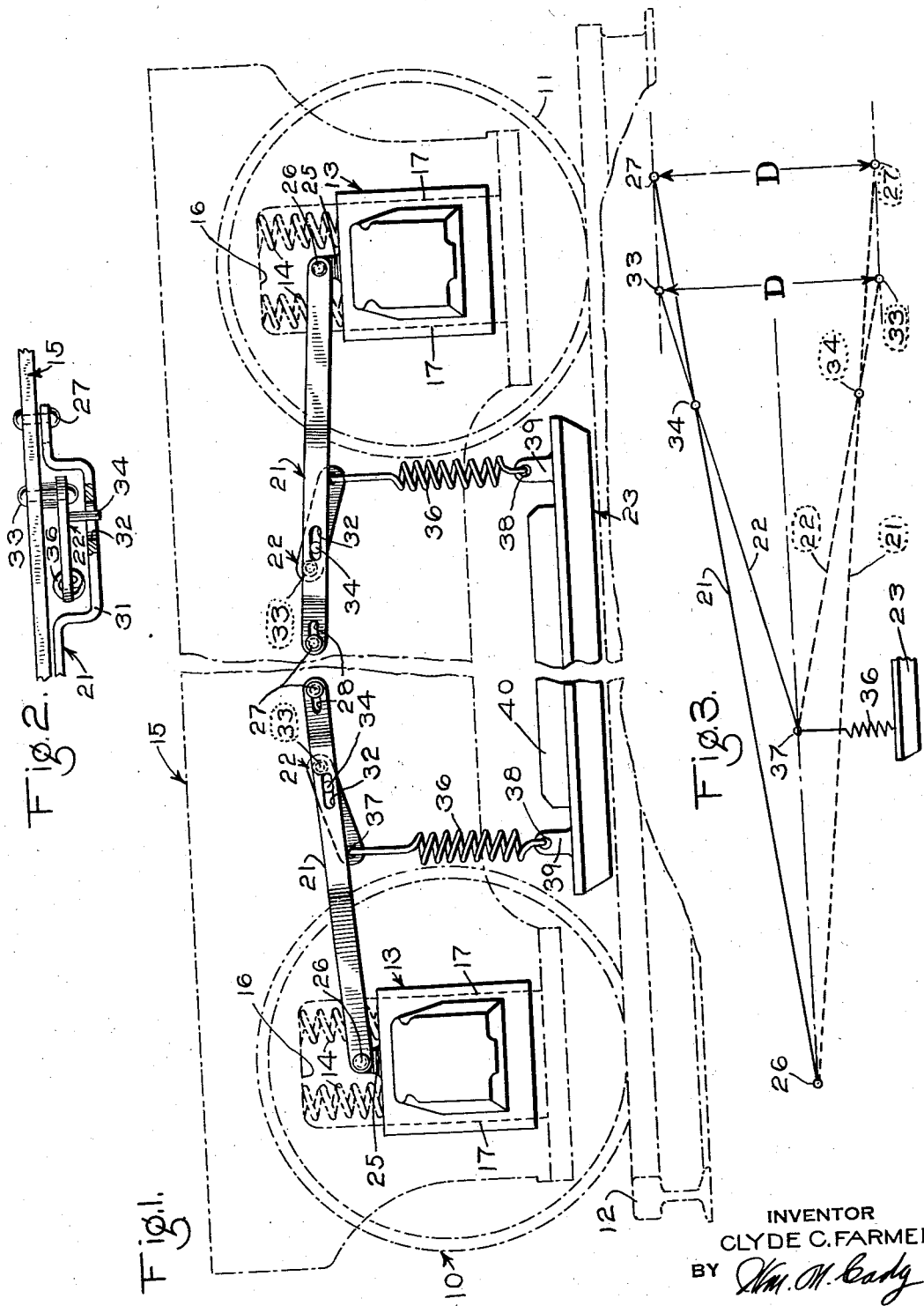
INVENTOR
CLYDE C. FARMER
BY *Wm. M. Cady*
ATTORNEY Nov. 21, 1939.  C. C. FARMER  2,180,870
MAGNETIC RAIL BRAKE
Filed Oct. 19, 1937  2 Sheets-Sheet 2
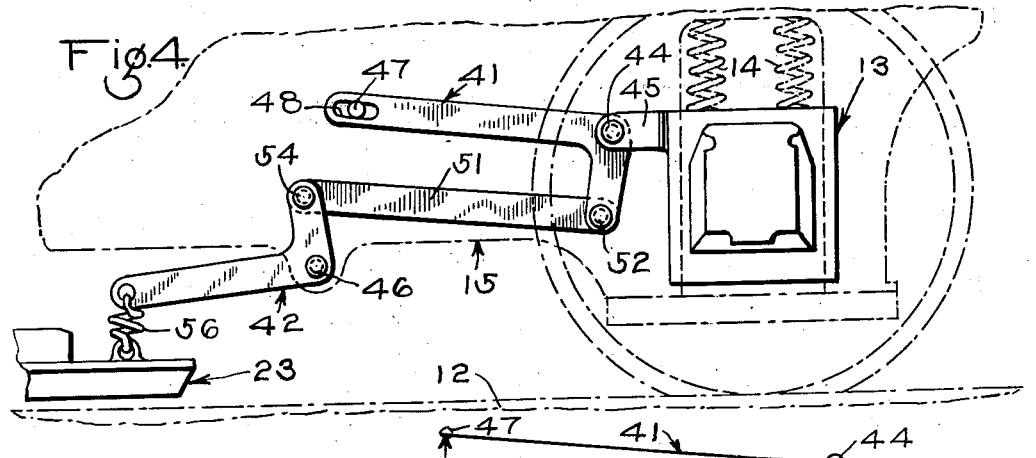
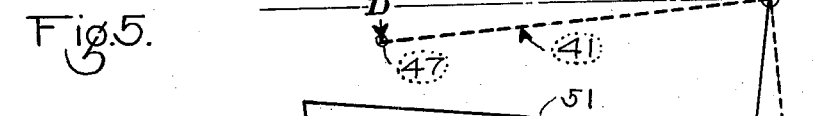
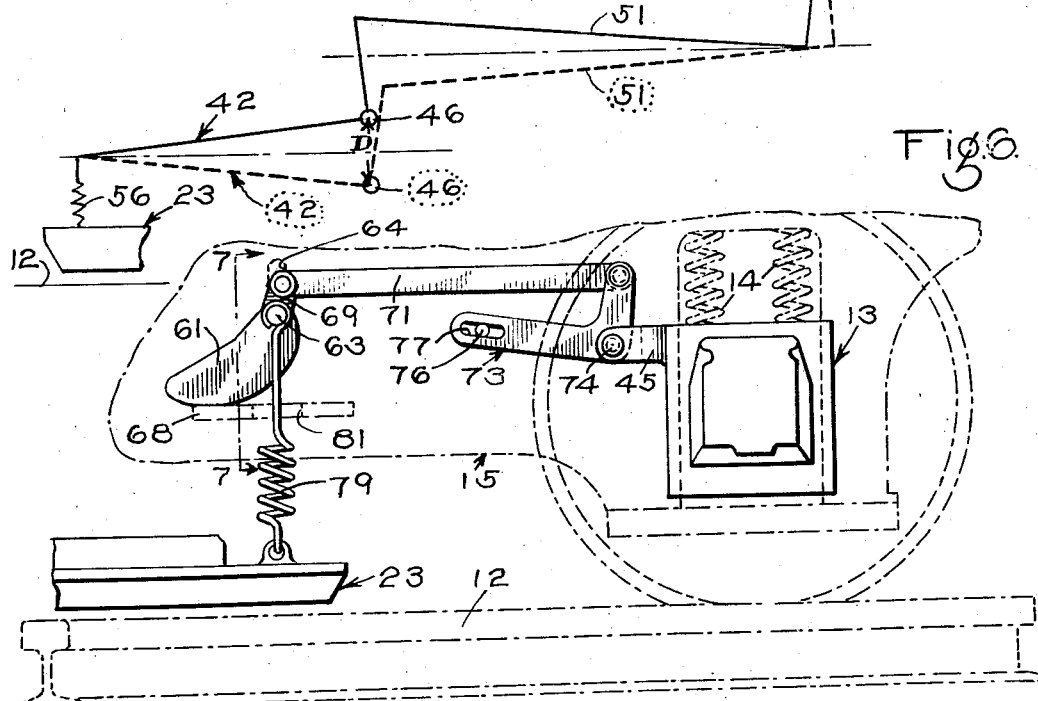
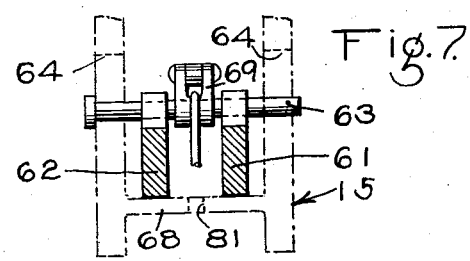
INVENTOR
CLYDE C. FARMER
BY Wm. M. Cady
ATTORNEY Patented Nov. 21, 1939

2,180,870

UNITED STATES PATENT OFFICE 2,180,870

MAGNETIC RAIL BRAKE

Clyde C. Farmer, Pittsburgh, Pa., assignor to The Westinghouse Air Brake Company, Wilmerding, Pa., a corporation of Pennsylvania Application October 19, 1937, Serial No. 169,787

7 Claims. (Cl. 188—165)

This invention relates to rail brakes, such as magnetic rail brakes, and has particular relation to means for mounting and supporting rail brake shoes on wheel trucks.

In railway cars, particularly street railway cars, the wheel trucks for the cars are commonly of the type in which the side frames of the trucks are resiliently supported by springs on a fixed or unsprung part of the truck, such as the journal boxes associated with the wheel axles. In such a type of wheel truck the rail brake shoes cannot be suspended from the side frames of the wheel trucks, because the side frames of the wheel trucks move toward and away from the associated track rails with variations in load on the wheel trucks so that the rail brake shoes will not be maintained normally at a substantially constant elevation above the track rails, which is desirable in order to prevent undesired contact of the rail brake shoes with the track rails. Furthermore, due to the construction and arrangement of parts in such a wheel truck, it is difficult if not impracticable to suspend the rail brake shoes from an unsprung part of the truck, such as the journal boxes.

In the case of the type of wheel truck mentioned above, there is therefore a need for an improved simple and relatively inexpensive means for so mounting and supporting a rail brake shoe on the wheel truck that the rail brake shoe is maintained at a substantially constant elevation above the track rails for any load on the wheel truck; and the provision of such is the principal object of my present invention.

Another object of my invention is to provide means for supporting a rail brake shoe on a wheel truck, of the type described, so as to maintain the rail brake shoe normally at a substantially constant elevation above the track rail for any load on the wheel truck without interfering in any way with the usual application of the rail brake shoe to the rail.

The above objects, and other objects of my invention which will be made apparent in the subsequent description of my invention, may be attained by various embodiments thereof, three of which are illustrated in the accompanying drawings, wherein—

Fig. 1 is a broken diagrammatic view, showing a wheel truck and an associated rail brake shoe, together with one embodiment of my invention for maintaining a substantially constant normal elevation of a rail brake shoe above an associated track rail, Fig. 2 is a fragmentary plan view showing in further detail the construction of the mechanism shown in Fig. 1, Fig. 3 is a diagram which demonstrates the operation of the embodiment of my invention shown in Fig. 1, Fig. 4 is a fragmentary diagrammatic view, showing another embodiment of my invention, the mechanism for supporting only one end of the shoe being shown, Fig. 5 is a diagram which demonstrates the operation of the embodiment of my invention shown in Fig. 4, Fig. 6 is a fragmentary diagrammatic view showing a third embodiment of my invention, mechanism for supporting only end of the rail brake shoe being shown, and Fig. 7 is a sectional view, taken on the line 7—7 of Fig. 6, showing in further detail the construction of the mechanism shown in Fig. 6.

*Embodiment shown in Figs. 1 and 2*

Referring to Fig. 1 of the drawings, there is shown in outline form a wheel truck comprising a front wheel-and-axle unit and a rear wheel-and-axle unit, the wheels 10 and 11 of the front and the rear axle units being adapted to roll along a track rail 12. The wheel truck further comprises a journal box 13 for each axle on which the opposite ends of the truck side frame 15 are resiliently supported as by a plurality of interposed truck springs 14, illustrated as of the coil type.

The side frame 15 of the truck has formed at each end a so-called pedestal jaw 16, the spaced side members of which straddle the journal box 13 and move slidably in vertically extending grooves 17 formed on the opposite sides of the journal box 13.

When the car is empty and the wheel truck carries a so-called "empty" load, the truck springs 14 are compressed a minimum amount and the side frame 15 is raised a maximum distance away from the track rail 12. As the load on the car and consequently that on the truck side frame 15 increases, the truck springs 14 are increasingly compressed and the side frame 15 correspondingly lowers toward the track rail 12.

According to my invention, I provide two pairs of cooperating levers 21 and 22 for supporting and automatically maintaining opposite ends respectively of a rail brake shoe 23 at a substantially constant level or elevation above the track rail 12 for any load on the car, that is, for any position of the truck side frame 15 relative to the track rail. It should be understood that the length of the levers 21 and 22, relative to the length of the side frame 15, has been exaggerated disproportionately for clarity.

In view of the fact that each pair of levers 21 and 22 is similarly mounted and similarly operable, the manner of mounting and operation of only one pair of levers will be described. One end of the lever 21 is pivoted on an "unsprung" part of the truck, such as the journal box 13, as by a pin in an upstanding lug 25 formed on or attached to the upper face of a journal box 13, and the opposite end of the lever 21 is pivoted on a "sprung" part of the truck, such as the side frame 15, by a pin 27 fixed to or secured in the side frame 15. A slot 28 is provided at the end of lever 21 through which the pin 27 extends in order to accommodate the variation in distance between the two pins 26 and 27, as the lever 21 is pivoted in a clockwise direction, that is, pivoted downwardly through an angle upon downward movement of the truck side frame 15.

As shown in Fig. 1, the pin 27 is fixed to the truck side frame at a point above the horizontal line through the pin 26 carried on a journal box 13, so that when the vehicle or car is empty, the lever 21 is at an angle to the horizontal. The angle of the lever 21 to the horizontal may vary according to the amount of movement of the side frame of the truck toward the track rails when the load on the truck is increased from empty load to full or maximum load. The angle is preferably one-half of the total angle through which the lever 21 moves when the side frame 15 moves downwardly in response to an increase in the load on the truck from empty load to full or maximum load. The reason for this disposition of the lever 21 will be made apparent hereinafter.

As will be seen in Fig. 2, the lever 21 has a U-portion 31 therein to provide space between the lever 21 and the side frame 15 for the lever 22 which is relatively short compared to the lever 21 and pivoted on a pin 33 fixed to the truck side frame 15. The pin 33 is in spaced relation to and on a horizontal line with the pin 27. A laterally projecting pin 34 formed on or attached to the lever 22 at a point between the ends thereof extends into and is guided slidably in a slot 32 in the lever 21.

A coil spring 36 is provided for resiliently supporting one end of the rail brake shoe 23 from the free end of the lever 22. The spring 36 is illustrated for simplicity as having a hook at the upper end thereof which engages in an opening 37 at the free end of the lever 32 and a hook at the lower end which engages in an opening 38 in a supporting lug 39 formed on or attached to the rail brake shoe 23.

The levers 21 and 22 are so arranged and so proportioned in length that the distance from the pivot pin 26 on the journal box 13 to the pivot pin 34 on the lever 22 bears the same ratio to the distance from the opening 37 at the end of the lever 22 to the pin 34 as the distance from the pin 34 to the pin 27 bears to the distance from the pin 34 to the pin 33. The reason for the proportionality of these moment arms of the levers 21 and 22 will be made apparent hereinafter.

The rail brake shoe 23 is illustrated as of the magnetic type having a magnet winding 40 which, when energized, causes the rail brake shoe 23 to be magnetically attracted into frictional contact with the track rail 12 to effect a retarding or braking effect on the car. It should be understood, however, that my invention is readily adaptable to rail brake shoes which are moved into contact with the track rail in another manner, such as by pneumatic or mechanical means.

The operation of the embodiment of my invention shown in Fig. 1 may be more readily understood by reference to the diagram shown in Fig. 3, wherein the various levers and parts are designated by corresponding reference numerals. In Fig. 3, with the wheel truck carrying empty load, the levers 21 and 22 occupy the positions shown by the solid lines and the rail brake shoe 23 correspondingly is supported at a certain elevation above the associated track rail.

As the load on the car and thus on the wheel truck increases and the truck side frame 15 moves correspondingly downward toward the track rail, the pivot pin 34 on the lever 22 moves a lesser distance downwardly compared to the amount of downward movement of the pins 27 and 33, the amount which the pivot pin 34 moves downwardly comparing to the amount of downward movement of the pins 27 and 33 in substantially the same ratio which the moment arm on the lever 21 from the pivot pin 26 to the pivot pin 34 bears to the moment arm from the pivot pin 26 to the pin 27. It will, therefore, be apparent that as the side frame 15 of the wheel truck lowers toward the track rail with increase in load, the two levers 21 and 22 rotate in opposite directions so as to decrease the angle of separation therebetween.

Now assuming that the wheel truck carries one-half of maximum or full load, the pivot pins 27 and 33 will be at the level of the pin 26 on the journal box, and thus the levers 21 and 22 will be simultaneously in a horizontal position.

It will be apparent upon analysis that, due to the proportionality of the moment arms of the levers 21 and 22 on opposite sides of the pivot pin 34, the outer or free end of the lever 22, from which the rail brake shoe 23 is supported, is maintained at its original elevation and, therefore, that the rail brake shoe 23 is also maintained at its normal elevation above the track rail 12. Due to the shifting of the lever 22 to the horizontal position from a position at an angle to the horizontal, the free end of the lever 22 may shift slightly to the left from the position shown by the solid line, but the amount of such movement is not such as to cause the rail brake shoe 23 to be appreciably raised.

Assuming that the load on the wheel truck is increased to full or maximum load, the side frame 15 of the wheel truck and, consequently, the pivot pins 27 and 33 move downwardly a total distance D below their positions for the empty load on the car and the levers 21 and 22 correspondingly assume the positions indicated by the broken lines. It is clearly apparent from Fig. 3 that the two levers 21 and 22 have changed their angular relation without causing a change in the elevation of the outer or free end of the lever 22 and thus the rail brake 23 is at the same elevation above the track rail for full or maximum load on the wheel truck as it was for empty and half load. Consequently, it will be seen that the rail brake shoe will be supported at a substantially constant elevation above the track rail 12 for any load on the car truck over the range from empty load to full or maximum load.

The reason for disposing the lever 21 at an angle to the horizontal for empty load on the truck should now be apparent. Obviously, by such arrangement, the pivot pin 34 on the lever 22 moves in a substantially vertical line which corresponds to the chord of the arc of movement of the lever 21. Thus, the lateral displacement of the free end of the lever 22 on a horizontal line, which displacement would effect a slight raising of the rail brake shoe, is limited to the slight amount occurring when the two levers 21 and 22 are both in a horizontal position.

Embodiment shown in Fig. 4

Referring to Fig. 4 of the drawings, a second embodiment of my invention is shown which comprises a type of lever mechanism, for supporting the rail brake shoes, different from that shown in Fig. 1. The lever mechanism for each end of the rail brake shoe, comprises two bell-crank levers 41 and 42. The bell-crank lever 41 is pivoted at the fulcrum thereof on an "unsprung" part of the wheel truck, such as the journal box 13, by a pin 44 in a lug 45 formed on or attached to the journal box 13, and the bell-crank lever 42 is pivoted at the fulcrum thereof on a "sprung" part of the wheel truck, such as the side frame 15, by a pin 46 fixed to the side frame.

The outer end of one lever arm of the bell-crank lever 41 is pivotally connected to the side frame 15 as by a pin 47 fixed to the side frame and received in a slot 48 at the end of the lever arm.

The outer end of the other lever arm of the bell-crank lever 41 and the outer end of one of the lever arms of the bell-crank lever 42 are connected by a link 51, one end of the link 51 being pivoted on the arm of the bell-crank lever 41 as by a pin 52 and the opposite end of the link 51 being pivoted on the arm of the bell-crank lever 42 as by a pin 54. The rail brake shoe 23 is suspended, at one end, on the outer end of the other arm of the bell-crank lever 42 through the medium of a coil spring 56.

The arms of each of the bell-crank levers 41 and 42 are preferably at right angles to each other and one arm is relatively long compared to the other arm. The relatively long arm of the bell-crank lever 41 is pivoted to the side frame 15 by the pin 47 and the rail brake shoe 23 is suspended from the outer end of the relatively long arm of the bell-crank lever 42.

The bell-crank levers 41 and 42 may be of the same size but not necessarily, it being essential only that the corresponding long and short arms of the two bell-crank levers be proportional in length.

For the same reason as in the case of the lever 21 of Fig. 1, the long arm of the bell-crank lever 41 and the long arm of the bell-crank lever 42 are disposed at an angle to the horizontal when the wheel truck carries empty load. The angle to the horizontal of the long arm of each of the bell-crank levers is preferably substantially one-half the total angle through which the arm is moved when the side frame 15 is moved downwardly toward the track rail in response to an increase in load on the wheel truck from empty load to full load.

It will thus be apparent that the pin 47 moves on a vertical line corresponding to the chord of the arc of travel of the long arm of the bell-crank lever 41, as it is pivoted in a counterclockwise direction, that is downwardly, with an increase in load. As a result, the angular position of the bell-crank lever 41, and accordingly that of the bell-crank lever 42, corresponds closely over the entire range of load variation to the position of the side frame 15.

The operation of the embodiment shown in Fig. 4 is more readily understandable by reference to the diagram shown in Fig. 5, in which the various bell-crank levers and other parts are designated by corresponding reference numerals.

It will be observed that with empty load on the wheel truck, the bell-crank levers 41 and 42 assume respective positions as shown by the solid lines, the rail brake shoe 23 being thus supported at a certain desired elevation above the track rail 12.

As the load on the wheel truck increases, the side frame 15 is correspondingly lowered toward the track rail and thus the bell-crank lever 41 is pivotally moved on the pin 44 fixed on the journal box 13. At the same time, the bell-crank lever 42 is rotated pivotally on the pin 46 which is being lowered together and simultaneously with the side frame 15.

Since, as previously stated, the long arm of the bell-crank levers 41 and 42 are disposed at an angle to the horizontal which is one-half the total angle through which the bell-crank levers rotate, it will be apparent that when the wheel truck carries one-half of its maximum load, the long arm of each of the bell-crank levers 41 and 42 are both in a horizontal position. Thus, the outer end of the long arm of the bell-crank lever 42 supporting the brake shoe 23 is moved slightly in the left-hand direction from the normal vertical line of suspension of the rail brake shoe, but remains at the same elevation as for an empty load on the wheel truck, and consequently the rail brake shoe likewise remains substantially at its original elevation above the track rail.

When the wheel truck carries a full or maximum load, the pivot pin 47 of the bell-crank lever 41 and the fulcrum pin 46 for the bell crank lever 42 are lowered toward the rail a total distance indicated by the letter D, and the bell-crank levers 41 and 42 correspondingly assume respective positions indicated by the broken lines.

As will be clearly seen in the diagram, the long arm of the bell-crank lever 42 is at the same angle below the horizontal line with maximum load on the wheel truck as it was above the horizontal line for empty load carried by the wheel truck, and thus the point on the long arm of the bell-crank lever 42 from which the rail brake shoe 23 is suspended is in the identical position which it was under empty load conditions.

It will thus be apparent that with both ends of the rail brake shoe 23 adjustably supported in the manner above described, the rail brake shoe will be maintained at a substantially constant elevation above the track rail for any load on the wheel truck over the entire range between empty and full load.

Embodiment shown in Figs. 6 and 7

Referring to Figs. 6 and 7 of the drawings, a third embodiment of my invention is shown for supporting the rail brake shoes at a substantially constant elevation above an associated track rail. The mechanism shown comprises two laterally spaced cams 61 and 62 that are keyed or otherwise suitably fixed on a rod or shaft 63 which is slidably guided in registering vertical slots 64 formed in two spaced walls of the truck side frame 15.

Connecting the two spaced vertical walls of the side frame 15 is a horizontal shelf 68 with which the cams 61 and 62 cooperate in a manner to be hereinafter pointed out.

Fixed to the shaft 63 at a point between the cams 61 and 62 is a short lever 69, the outer end of the lever being formed as a clevis to receive pivotally one end of a link 71, the other end of which is pivotally connected to the outer end of one arm of a bell-crank lever 73. The bell-crank lever 73 is pivoted at the fulcrum thereof on an unsprung portion of the wheel truck, such as the journal box 13, as by a pin 74 in a lug 45 on the journal box. The outer end of the other arm of the bell-crank lever 73 is pivotally connected to a sprung portion of the vehicle, such as the side frame 15 of the truck, as by a pin 76 fixed to the side frame and engaging in a slot 77 at the end of the lever arm.

For the same reason as in the case of the lever 21 of Fig. 1, the arm of the bell-crank lever 73 which pivots on the pin 76 is disposed at an angle to the horizontal when the wheel truck carries empty load. Thus the pin 76 moves downwardly on a vertical line corresponding to the chord of the arc of lever movement of the lever arm of the bell-crank lever 73, thereby causing the bell-crank lever 73 to correspond closely in angular position to the position of the side frame 15 over the entire range of load from empty load to full load on the wheel truck.

The rail brake shoe 23 is suspended, at one end, from the shaft 63 by means of a coil spring 79 which is suitably formed at its upper and lower end for attachment to the shaft and to the rail brake shoe. A slot 81 is provided in the shelf 68 to permit the shank or stem portion at the upper end of the coil spring 79 to extend upwardly therethrough and between the cams 61 and 62 to the shaft 63.

The bell-crank lever 73 and the cams 61 and 62 are so designed and so arranged that when the truck side frame 15 moves downwardly toward the track rails according to the increase in load on the wheel truck, the bell-crank lever 73 pivots on the pin 74, in a counterclockwise direction, to cause a corresponding rotation of the cams 61 and 62 in a counterclockwise direction, as viewed in Fig. 6, the degree of rotation of the cams 61 and 62 and the contour of the cams being such as to support the shaft 63 on the shelf 68 of the side frame 15 at a constant elevation despite the lowering of the side frame 15. Obviously, the slots 64 in the walls of the truck side frame 15 enable the shaft 63 to move with respect to the side frame and guide it in a vertical line so that the line of suspension of the end of the rail brake shoe remains unchanged.

In view of the fact that the rail brake shoe 23 is suspended at each end from corresponding shafts 63, it will be apparent that the rail brake shoe 23 is maintained at a constant elevation above the track rail for any load on the wheel truck over the entire range from empty to full load.

Summary

Summarizing, it will be seen that I have disclosed three embodiments of my invention for supporting and automatically adjusting the position of a rail brake shoe to maintain a constant elevation thereof above the associated track rails for any load on the wheel truck over the entire range from empty to maximum load, without in any way interfering with the application of the rail brake shoes to the rails in the usual manner.

While I have disclosed only three embodiments of my invention, it will be apparent that various omissions, additions or modifications may be made in any of the embodiments without departing from the spirit of my invention and it is, therefore, not my intention to limit the scope of my invention except as it is necessitated by the scope of the prior art.

Having now described my invention, what I claim as new and desire to secure by Letters Patent, is:

1. In combination, a car truck having a sprung part and an unsprung part movable to different positions relative to each other according to the load on the truck, a rail brake element, two levers pivotally connected to each other intermediate the ends thereof, one of said levers supporting said rail brake element, the said two levers being so arranged as to assume different angles with respect to each other according to the relative position of the sprung and unsprung parts of the said truck and thereby cause the said one lever to maintain the said rail brake element normally in a position which is a substantially constant distance above a cooperating track rail for any load carried on the truck.

2. In combination, a car truck having a sprung part and an unsprung part adapted to have different relative positions according to the load carried by the truck, a rail brake element, a first lever pivoted at one end on the unsprung part of the truck and pivotally movable through an arc to different positions according to the position of the sprung part of the truck relative to the unsprung part, a second lever pivoted at one end on the sprung part of the truck and having pivotal connection with said first lever at a point intermediate the ends of said first lever, said second lever being arranged to support said rail brake shoe, the said first and said second levers being arranged so that upon relative movement between the sprung and unsprung parts of the truck, the said second lever maintains the rail brake element at a substantially constant elevation above an associated track rail.

3. In combination, a car truck having a sprung part and an unsprung part adapted to have different relative positions according to the load on the truck, a rail brake element, a first bell-crank lever pivoted at the fulcrum thereof on the unsprung part of said truck and having one arm pivoted on the sprung part of said truck, a second bell-crank lever pivoted at the fulcrum thereof on the sprung part of said truck and having one arm thereof arranged to support said rail brake element, means connecting the other arm of the first bell-crank lever to the other arm of the said second-bell crank lever, the arrangement of said bell-crank levers being such that the arm of the second bell-crank lever which supports the rail brake element is always positioned so as to maintain the rail brake elements normally a substantially constant distance above an associated track rail.

4. In combination, a car truck having a sprung part and an unsprung part adapted to have different positions relative to each other according to the load on the truck, a rail brake element, two bell-crank levers the corresponding arms of which are proportional in length, one of said levers being pivoted at the fulcrum thereof on the unsprung part of the truck and having one arm thereof pivoted on the sprung part of the truck, the other of said levers being pivoted at the fulcrum thereof on the sprung part of the truck and having one arm thereof arranged to support said rail brake element, means connecting the other arm of the first said lever to the other arm of the said other lever, the arrangement of said levers being such that upon relative movement between the sprung and the unsprung parts of the truck, the arm of the said second lever which supports the rail brake element is always positioned so as to support the rail brake element a substantially constant distance above an associated track rail.

5. In combination, a vehicle truck having a sprung part and an unsprung part adapted to have different relative positions according to the load on the truck, a rail brake element, an element for supporting the said rail brake element, a cam element arranged to support said element on the sprung part of said truck and effective upon rotation to vary the position of said element relative to the sprung part of the truck, and means for rotating said cam element correspondingly upon variation in the relative position between the sprung and unsprung parts on the said truck to maintain the said supporting element for the rail brake element at a substantially constant elevation so that the rail brake element is maintained a substantially constant distance away from the associated track rail for any load on the truck.

6. In combination, a vehicle truck having a sprung part and an unsprung part adapted to have different relative positions according to the load on the truck, a rail brake element, an element for supporting the said rail brake element, a cam element arranged to support said element on the sprung part of said truck and effective upon rotation to vary the position of said element relative to the sprung part of the truck, and means for rotarily positioning said cam element according to the relative position of the sprung and unsprung parts of the truck so as to maintain the said element at a substantially constant level and thereby cause the rail brake element to be maintained normally a substantially constant distance above the associated track rail for any load on the truck.

7. A magnetic track brake for a vehicle truck having both sprung and unsprung parts, comprising in combination, a first lever pivotally mounted on an unsprung part of the truck, a second lever pivotally mounted on a sprung part of the truck, a magnetic track brake device, means for suspending said magnetic track brake device from one of said levers in a manner to permit movement of the brake device relative to said one lever so that said brake device may be shifted into engagement with a track rail without movement of said one lever when applying the brakes, and means so relating said two levers that said brake device is maintained normally a substantially fixed distance above the track rail, when the brakes are released, notwithstanding relative movement between the said sprung and unsprung parts.

CLYDE C. FARMER.